US010449686B2

(12) United States Patent
Tozuka et al.

(10) Patent No.: US 10,449,686 B2
(45) Date of Patent: Oct. 22, 2019

(54) CUTTING LINE POSITIONING APPARATUS AND METHOD THAT DETERMINE AND PLACE CUTTING LINE AT OPTIMAL LOCATION ON SHEET TO BE CUT

(71) Applicant: Roland DG Corporation, Hamamatsu-shi, Shizuoka (JP)

(72) Inventors: Takeshi Tozuka, Hamamatsu (JP); Kazutoshi Funakoshi, Hamamatsu (JP)

(73) Assignee: ROLAND DG CORPORATION, Shizuoka (JP)

( * ) Notice: Subject to any disclaimer, the term of this patent is extended or adjusted under 35 U.S.C. 154(b) by 49 days.

(21) Appl. No.: 15/848,214

(22) Filed: Dec. 20, 2017

(65) Prior Publication Data

US 2018/0169890 A1   Jun. 21, 2018

(30) Foreign Application Priority Data

Dec. 21, 2016   (JP) .................................. 2016-247633

(51) Int. Cl.
  *B26F 1/38* (2006.01)
  *B26D 3/08* (2006.01)
  (Continued)

(52) U.S. Cl.
  CPC ............ *B26F 1/3806* (2013.01); *B26D 3/085* (2013.01); *B26D 5/005* (2013.01); *B26F 1/18* (2013.01); *G05B 19/414* (2013.01)

(58) Field of Classification Search
  CPC . B26D 3/085; B26D 5/005; B26F 1/18; B26F 1/3806; G05B 19/414
  See application file for complete search history.

(56) References Cited

U.S. PATENT DOCUMENTS 3,970,830 A * 7/1976 White .................. G05B 19/184
                                                 700/187
6,449,526 B1 * 9/2002 Sachs ..................... B23Q 17/09
                                                 700/164

FOREIGN PATENT DOCUMENTS

JP        06-238594 A     8/1994

OTHER PUBLICATIONS

Tozuka et al., "Cutting Line Positioning Apparatus, Cutting System, Non-Transitory Computer-Readable Storage Medium Storing Cutting Line Positioning Computer Program, and Cutting Line Position Method", U.S. Appl. No. 15/848,209, filed Dec. 20, 2017.

* cited by examiner

*Primary Examiner* — Chun Cao
(74) *Attorney, Agent, or Firm* — Keating & Bennett, LLP

(57) ABSTRACT

A candidate point selection processor selects, as candidate points, vertices on an outline. A search point selection processor selects, from the candidate points, a reference search point to be used to search for a point that serves as a cutting line endpoint. A reference line setting processor sets a reference line connecting a reference point with the search point. A candidate line setting processor sets candidate lines connecting the search point with the candidate points other than the search point. A candidate line selection processor selects, as a selected candidate line, the candidate line located only within a non-effective region. An angle calculation processor calculates an angle between the reference line and the selected candidate line. A cutting line setting processor sets a cutting line connecting the search point with the candidate point of the selected candidate line defining an angle with the reference line that is the smallest angle calculated.

8 Claims, 10 Drawing Sheets

(51) Int. Cl.
    *B26F 1/18*     (2006.01)
    *B26D 5/00*     (2006.01)
    *G05B 19/414*     (2006.01)

CUTTING LINE POSITIONING APPARATUS AND METHOD THAT DETERMINE AND PLACE CUTTING LINE AT OPTIMAL LOCATION ON SHEET TO BE CUT

CROSS REFERENCE TO RELATED APPLICATIONS

This application claims the benefit of priority to Japanese Patent Application No. 2016-247633 filed on Dec. 21, 2016. The entire contents of this application are hereby incorporated herein by reference.

BACKGROUND OF THE INVENTION

1. Field of the Invention

The present invention relates to cutting line positioning apparatuses, cutting systems, non-transitory computer-readable storage media storing cutting line positioning computer programs, and cutting line positioning methods.

2. Description of the Related Art

A cutting apparatus for cutting a sheet is known in the related art. As used herein, the term "cutting" refers not only to cutting a sheet entirely in its thickness direction but also to cutting a sheet partially in its thickness direction. In one example, a cutting apparatus includes a carriage two-dimensionally movable relative to a sheet, and a cutter mounted on the carriage.

Examples of sheets to be cut by such a cutting apparatus include a sheet disclosed in JP 6-238594 A. The sheet disclosed in JP 6-238594 A includes a base sheet, and a top sheet affixed to a surface of the base sheet with an adhesive. The top sheet includes a region where a necessary target object, such as a character or a figure, is present (which will hereinafter be referred to as an "effective region"), and a region other than the effective region (which will hereinafter be referred to as a "non-effective region"). In one example, a portion of the top sheet within the effective region is left on the base sheet, and a portion of the top sheet within the non-effective region is removed from the base sheet.

In some cases, a portion of the top sheet within the non-effective region is not successfully removed from the base sheet depending on the shape of a target object. This may split or tear the target object. To prevent the target object from splitting and tearing, a cut is made on a portion of the top sheet within the non-effective region. Such a cut will hereinafter be referred to as a "cutting line".

Conventionally, a location of a cutting line on a top sheet of a sheet to be cut by a cutting apparatus is decided by a user based on his or her experience. Thus, some users may be unable to place a cutting line at an optimal location. If a cutting line is not located at an optimal location, a portion of a top sheet within a non-effective region may not be properly removed from a base sheet. This may result in breakage of a target object.

SUMMARY OF THE INVENTION

Accordingly, preferred embodiments of the present invention provide cutting line positioning apparatuses, cutting systems, non-transitory computer-readable storage media storing a cutting line positioning computer program, and cutting line positioning methods that place a cutting line at an optimal location on a sheet to be cut by a cutting apparatus.

A preferred embodiment of the present invention provides a cutting line positioning apparatus to decide a location of a cutting line on a sheet. The sheet includes a base sheet and a top sheet. The top sheet is affixed with an adhesive material to a surface of the base sheet and has a target object located thereon. The cutting line serves as a reference line when a cut is made on the top sheet. The top sheet is cut along an outline of the target object on the top sheet by a cutting apparatus. The top sheet includes an effective region and a non-effective region. The effective region is a region of the top sheet to be left on the base sheet. The non-effective region is a region of the top sheet to be removed from the base sheet. The positioning apparatus includes a storage processor, a candidate point selection processor, a search point selection processor, a reference line setting processor, a candidate line setting processor, a candidate line selection processor, an angle calculation processor, and a cutting line setting processor. The storage processor stores a reference point defined in advance on the top sheet. The candidate point selection processor is configured or programmed to select a plurality of vertices on the outline obtained when the outline is represented as a polyline. The vertices are each selected as a candidate point that serves as an endpoint of the cutting line. The search point selection processor is configured or programmed to select, from the candidate points, a reference search point to be used to search for a point that serves as an endpoint of the cutting line. The reference line setting processor is configured or programmed to set a reference line. The reference line is a line connecting the reference point with the search point. The candidate line setting processor is configured or programmed to set candidate lines. The candidate lines are a plurality of lines each connecting the search point with an associated one of the candidate points other than the search point. The candidate line selection processor is configured or programmed to select, as a selected candidate line, the candidate line located only within the non-effective region, and configured or programmed to select, as the selected candidate line, the candidate line on the outline when none of the candidate lines is located only within the non-effective region. The angle calculation processor is configured or programmed to calculate an angle between the reference line and the selected candidate line. The cutting line setting processor is configured or programmed to set the cutting line. The cutting line is a line connecting the search point with the candidate point of the selected candidate line defining an angle with the reference line that is the smallest angle calculated by the angle calculation processor.

The positioning apparatus places the cutting line at a location where the cutting line surrounds the effective region together with a portion of the outline of the target object. The cutting line placed by the positioning apparatus is not located within the effective region that is a necessary region. Thus, the positioning apparatus enables automatic placement of the cutting line such that the cutting line does not overlap with a portion of the top sheet within the effective region that is a necessary region. Because the vertices obtained when the outline is represented as a polyline are set to be candidate points by the positioning apparatus, a larger number of candidate points are provided. Consequently, the endpoint of the cutting line is selected from a larger number of candidate points so as to facilitate placement of the cutting line at an optimal location.

Another preferred embodiment of the present invention provides a cutting line positioning method for deciding a location of a cutting line on a sheet. The sheet includes a base sheet and a top sheet. The top sheet is affixed with an adhesive material to a surface of the base sheet and has a target object located thereon. The cutting line serves as a reference line when a cut is made on the top sheet. The top sheet is cut along an outline of the target object on the top sheet by a cutting apparatus. The top sheet includes an effective region and a non-effective region. The effective region is a region of the top sheet to be left on the base sheet. The non-effective region is a region of the top sheet to be removed from the base sheet. The method includes a candidate point selection step, a search point selection step, a reference line setting step, a candidate line setting step, a candidate line selection step, an angle calculation step, and a cutting line setting step. The candidate point selection step includes selecting a plurality of vertices on the outline obtained when the outline is represented as a polyline. The vertices are each selected as a candidate point that serves as an endpoint of the cutting line. The search point selection step includes selecting, from the candidate points, a reference search point to be used to search for a point that serves as an endpoint of the cutting line. The reference line setting step includes setting a reference line. The reference line is a line connecting the search point with a reference point defined in advance on the top sheet. The candidate line setting step includes setting candidate lines. The candidate lines are a plurality of lines each connecting the search point with an associated one of the candidate points other than the search point. The candidate line selection step includes selecting, as a selected candidate line, the candidate line located only within the non-effective region, and includes selecting, as the selected candidate line, the candidate line on the outline when none of the candidate lines is located only within the non-effective region. The angle calculation step includes calculating an angle between the reference line and the selected candidate line. The cutting line setting step includes setting the cutting line. The cutting line is a line connecting the search point with the candidate point of the selected candidate line defining an angle with the reference line that is the smallest angle calculated in the angle calculation step.

The preferred embodiments of the present invention place the cutting line at an optimal location on the sheet to be cut by the cutting apparatus.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Cutting systems including cutting line positioning apparatuses according to preferred embodiments of the present invention will be described below with reference to the drawings. In the following description, a cutting line positioning apparatus may simply be referred to as a "positioning apparatus". The preferred embodiments described below are naturally not intended to limit the present invention in any way. Components or elements having the same functions are identified by the same reference signs, and description thereof will be simplified or omitted when deemed redundant.

Figure 1:
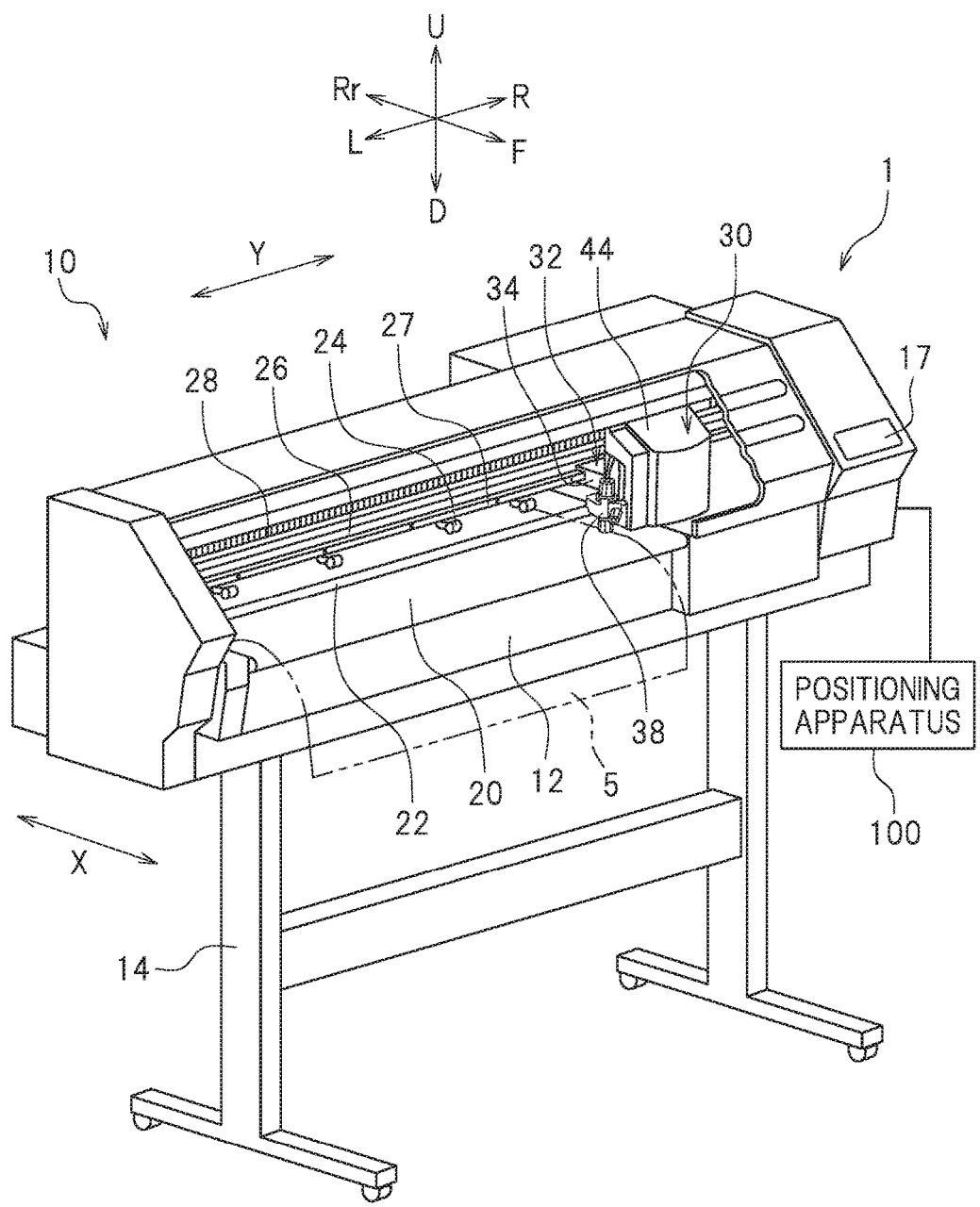
FIG. 1 is a perspective view of a cutting apparatus of a cutting system according to a preferred embodiment of the present invention.

FIG. 1 is a schematic diagram illustrating a cutting system 1 according to the present preferred embodiment. More specifically, FIG. 1 is a perspective view of a cutting apparatus 10 included in the cutting system 1. The following description is based on the assumption that when a user faces the front of the cutting apparatus 10, a direction from the rear of the cutting apparatus 10 toward the user is a forward direction and a direction from the user toward the rear of the cutting apparatus 10 is a rearward direction. The terms "right", "left", "up", and "down" respectively refer to right, left, up, and down with respect to the user facing the front of the cutting apparatus 10. The reference signs F, Rr, R, L, U, and D in the drawings respectively represent front, rear, right, left, up, and down. These directions are defined merely for the sake of convenience of description and do not limit in any way how the cutting system 1 may be installed. The reference sign Y represents a main scanning direction. The reference sign X represents a sub-scanning direction perpendicular to the main scanning direction Y in a plan view. The main scanning direction Y and the sub-scanning direction X are not limited to any particular directions but may be any suitable directions.

As illustrated in FIG. 1, the cutting system 1 includes the cutting apparatus 10 and a cutting line positioning apparatus 100. The cutting apparatus 10 cuts a sheet 5 into a desired shape. The sheet 5 is to be used as a label or a sticker, for example. In the present preferred embodiment, the cutting apparatus 10 includes a body 12, a platen 20, a grit roller 22, a plurality of pinch rollers 24, a guide rail 26, a belt 28, and a cutting head 30.

The body 12 extends in the main scanning direction Y. In the present preferred embodiment, the body 12 is supported by a stand 14. The right portion of the body 12 is provided with an operation panel 17. The operation panel 17 presents the status of the cutting apparatus 10 and information on cutting, for example.

The platen 20 is disposed in the body 12. The sheet 5 is placed on the platen 20. The platen 20 is provided with the grit roller 22 having a cylindrical shape. The grit roller 22 is embedded in the platen 20 such that the upper surface portion of the grit roller 22 is exposed. The grit roller 22 functions as a feeder to move the sheet 5 in the sub-scanning direction X. The grit roller 22 is connected with a feed motor 22a (see FIG. 4). The grit roller 22 is driven by the feed motor 22a. The plurality of pinch rollers 24 are disposed above the grit roller 22. The pinch rollers 24 face the grit roller 22 in the up-down direction. The positions of the pinch rollers 24 in the up-down direction are adjustable in accordance with the thickness of the sheet 5. In the present preferred embodiment, the sheet 5 is sandwiched between the grit roller 22 and the pinch rollers 24. The grit roller 22 and the pinch rollers 24 convey the sheet 5 in the sub-scanning direction X, with the sheet 5 sandwiched between the grit roller 22 and the pinch rollers 24.

The guide rail 26 is provided in the body 12. The guide rail 26 is disposed above the platen 20. The guide rail 26 is disposed in parallel or substantially in parallel with the platen 20. The guide rail 26 extends in the main scanning direction Y. In the present preferred embodiment, the guide rail 26 includes an engagement portion 27 protruding forward.

The belt 28 is disposed in the body 12. The belt 28 is an endless belt. The belt 28 extends in the main scanning direction Y. In the present preferred embodiment, the right and left ends of the belt 28 are each wound around an associated one of first and second pulleys (not illustrated). The first pulley is connected to a drive motor 28a (see FIG. 4) to drive the first pulley. The drive motor 28a is connected to the belt 28 through the first pulley. Rotation of the drive motor 28a rotates the first pulley so as to cause the belt 28 to run in the main scanning direction Y. In the present preferred embodiment, a carriage 32 (which will be described below) is secured to the belt 28. Rotation of the drive motor 28a enables movement of the carriage 32 relative to the sheet 5 in the main scanning direction Y.

Figure 2:
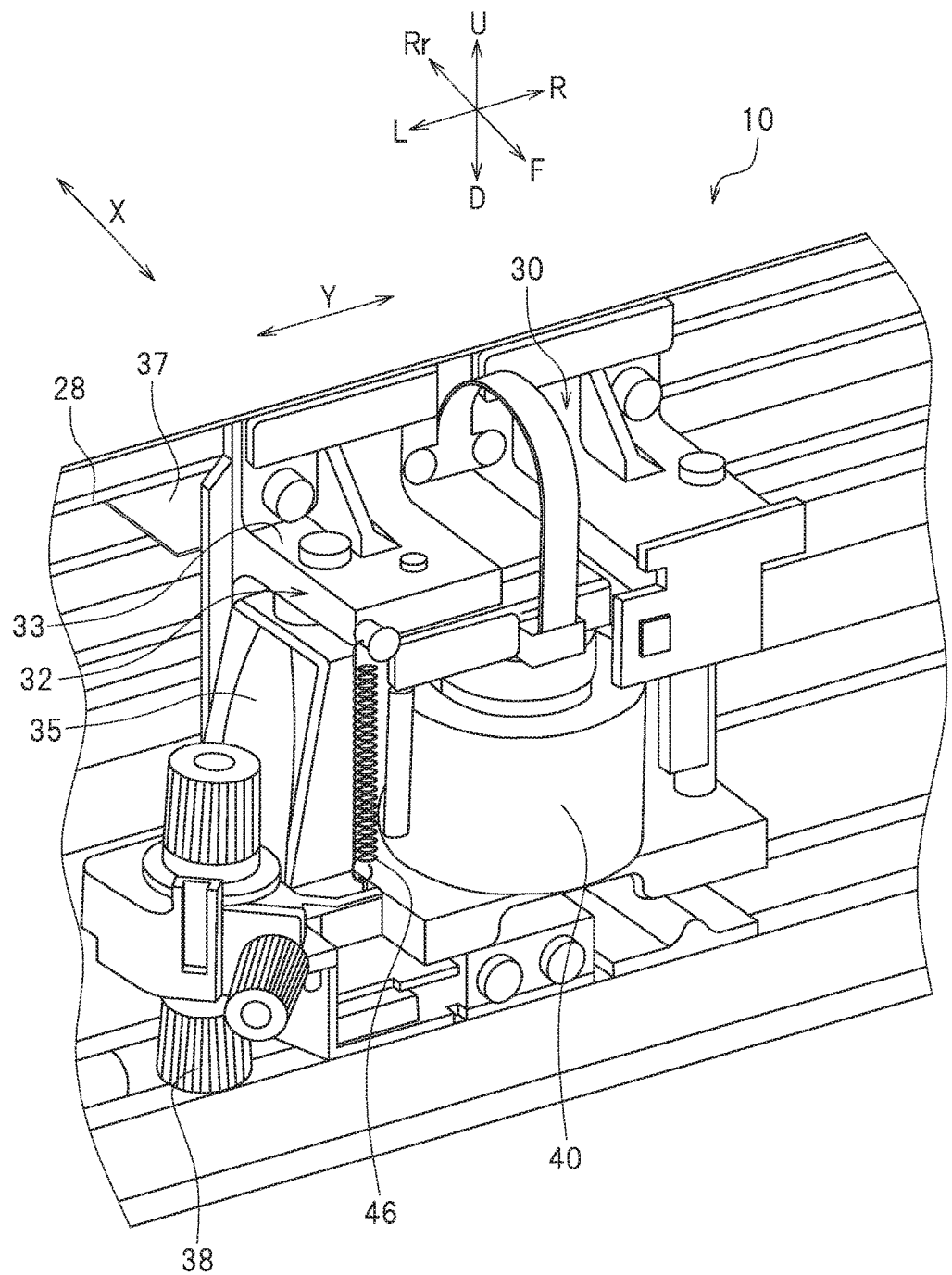
FIG. 2 is a perspective view of a cutting head.

The cutting head 30 is movable in the main scanning direction Y along the guide rail 26. The cutting head 30 cuts the sheet 5. FIG. 2 is a perspective view of the cutting head 30. FIG. 2 illustrates the cutting head 30 from which a cover 44 (see FIG. 1) is detached. As illustrated in FIG. 2, the cutting head 30 includes the carriage 32, a cutter 38, and a cylindrical voice coil motor 40.

The carriage 32 supports a holder 35 (which will be described below). The carriage 32 is movable relative to the sheet 5. The carriage 32 is supported by the guide rail 26 (FIG. 1) such that the carriage 32 is slidable along the guide rail 26. The carriage 32 is secured to the belt 28. Running the belt 28 moves the carriage 32 in the main scanning direction Y along the guide rail 26. The cutter 38 and the voice coil motor 40 move in the main scanning direction Y together with the carriage 32. The carriage 32 includes a carriage base 33 supporting the cutter 38 and the voice coil motor 40.

The carriage 32 further includes a guide 34 (see FIG. 1) and a secured plate 37. As illustrated in FIG. 1, the guide 34 is in engagement with the engagement portion 27 of the guide rail 26. The guide 34 is slidable along the guide rail 26. As illustrated in FIG. 2, the secured plate 37 is secured to the belt 28. The guide 34 and the carriage base 33 are secured to each other with a bolt, for example.

The voice coil motor 40 is mounted on the carriage 32. The voice coil motor 40 is supported by the carriage base 33. The voice coil motor 40 is coupled to the holder 35. The voice coil motor 40 exerts a force on the holder 35 at least in a direction in which the holder 35 comes closer to the sheet 5 (see FIG. 1). In the present preferred embodiment, the voice coil motor 40 exerts an upward force or a downward force on the holder 35. The voice coil motor 40 is able to change the magnitude of the force to be exerted on the holder 35 in accordance with a signal (i.e., a current signal) supplied to the voice coil motor 40. The voice coil motor 40 included in the present preferred embodiment may be a voice coil motor known in the related art, for example.

The cutter 38 is mounted on the carriage 32. The cutter 38 is held by the holder 35 movable in the up-down direction. The holder 35 supports the cutter 38 such that the cutter 38 is movable toward and away from the sheet 5 (see FIG. 1). In the present preferred embodiment, the cutter 38 is disposed leftward of the holder 35. The position of the cutter 38, however, is not limited to any particular position. A spring 46 is provided between the holder 35 and the carriage base 33. The spring 46 exerts an upwardly urging force on the holder 35. The cutter 38 held by the holder 35 is movable in the up-down direction upon receiving a driving force from the voice coil motor 40.

Figure 3:
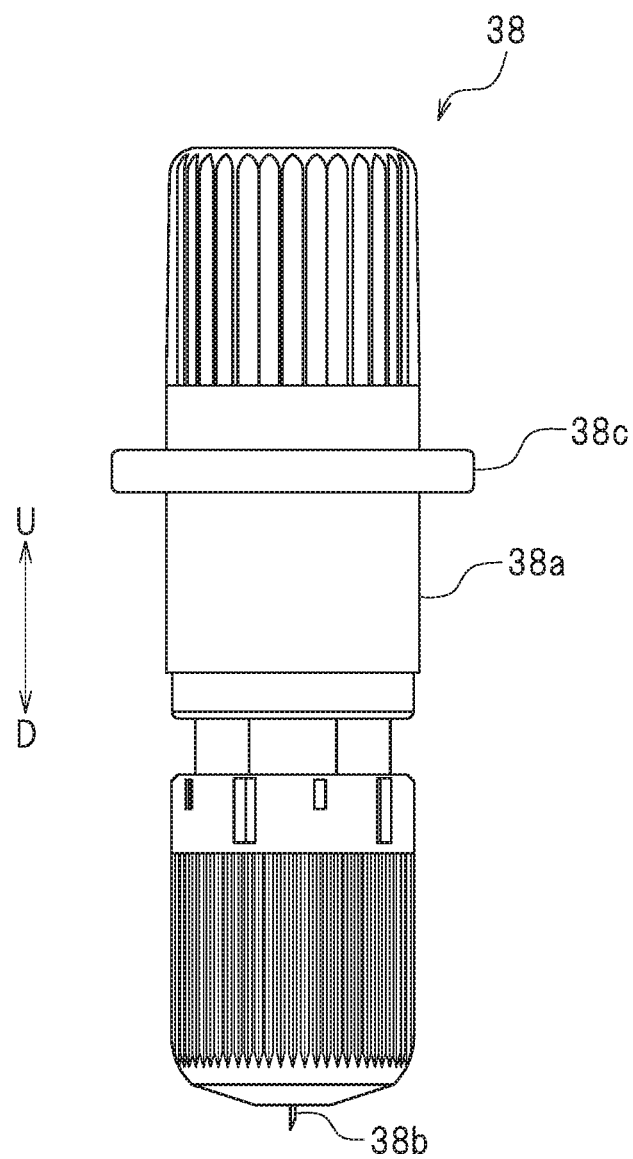
FIG. 3 is a front view of a cutter.

FIG. 3 is a front view of the cutter 38. As illustrated in FIG. 3, the cutter 38 has a rod shape and extends in the up-down direction. The cutter 38 includes a body 38a held by the holder 35 (see FIG. 2), a cutting edge 38b secured to the lower end of the body 38a, and a flange 38c provided on the body 38a. The sheet 5 (see FIG. 1) is cut by the cutting edge 38b of the cutter 38. As previously mentioned, the cutter 38 moves in the main scanning direction Y together with the carriage 32. Thus, the cutting edge 38b of the cutter 38 moves in the main scanning direction Y.

As illustrated in FIG. 1, the cover 44 may be attached to the carriage 32. The cover 44 covers at least a portion of the carriage 32. Providing the cover 44 in this manner prevents chips produced during cutting from intruding into the carriage 32.

When the cutting apparatus 10 cuts the sheet 5 as illustrated in FIG. 1, the position of the cutting edge 38b (see FIG. 3) of the cutter 38 in the up-down direction is adjusted by the voice coil motor 40 (see FIG. 2). After the position of the cutting edge 38b in the up-down direction has been adjusted, the sheet 5 is moved in the sub-scanning direction X by the grit roller 22 (see FIG. 1) described above, while the cutting edge 38b is moved in the main scanning direction Y by the drive motor 28a (see FIG. 4). Thus, the sheet 5 is cut into a desired shape.

Figure 4:
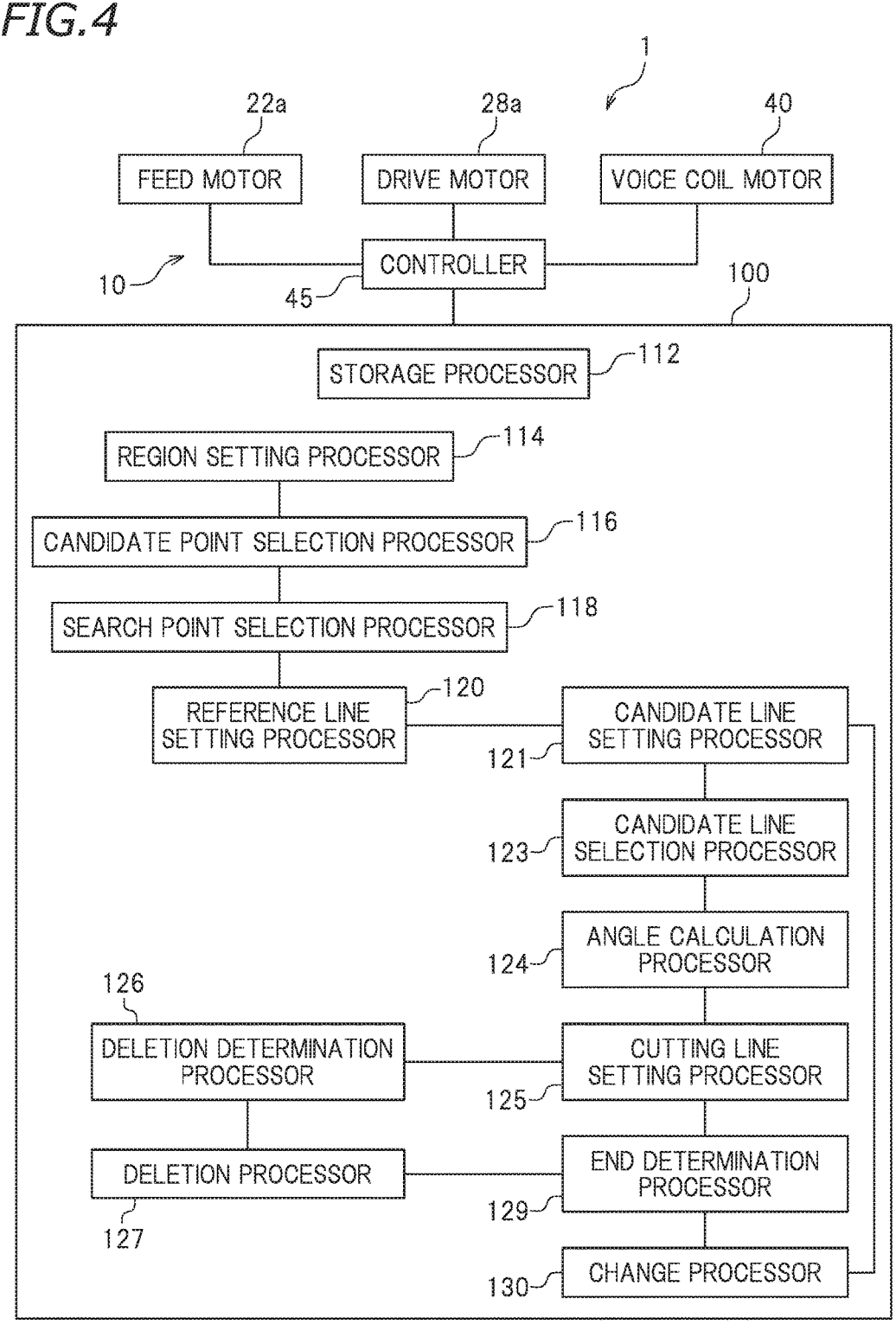
FIG. 4 is a block diagram of the cutting system.

FIG. 4 is a block diagram of the cutting system 1. As illustrated in FIG. 4, the cutting apparatus 10 includes a controller 45. The controller 45 is connected to the feed motor 22a connected to the grit roller 22. The controller 45 drives the feed motor 22a so as to drive the grit roller 22. This moves the sheet 5 in the sub-scanning direction X. The controller 45 is connected to the drive motor 28a to cause the belt 28 to run in the main scanning direction Y. The controller 45 drives the drive motor 28a so as to cause the belt 28 to run. This causes the carriage 32 secured to the belt 28 to move in the main scanning direction Y. The controller 45 is connected to the voice coil motor 40. The controller 45 controls driving of the voice coil motor 40 so as to control the up-down movement of the holder 35 (see FIG. 2) coupled to the voice coil motor 40 and the up-down movement of the cutter 38 (see FIG. 2) held by the holder 35. The controller 45 is not limited to any particular configuration. In one example, the controller 45 is a computer including a central processing unit (CPU), a read-only memory (ROM) storing, for example, a program to be executed by the CPU, and a random-access memory (RAM).

Figure 5:
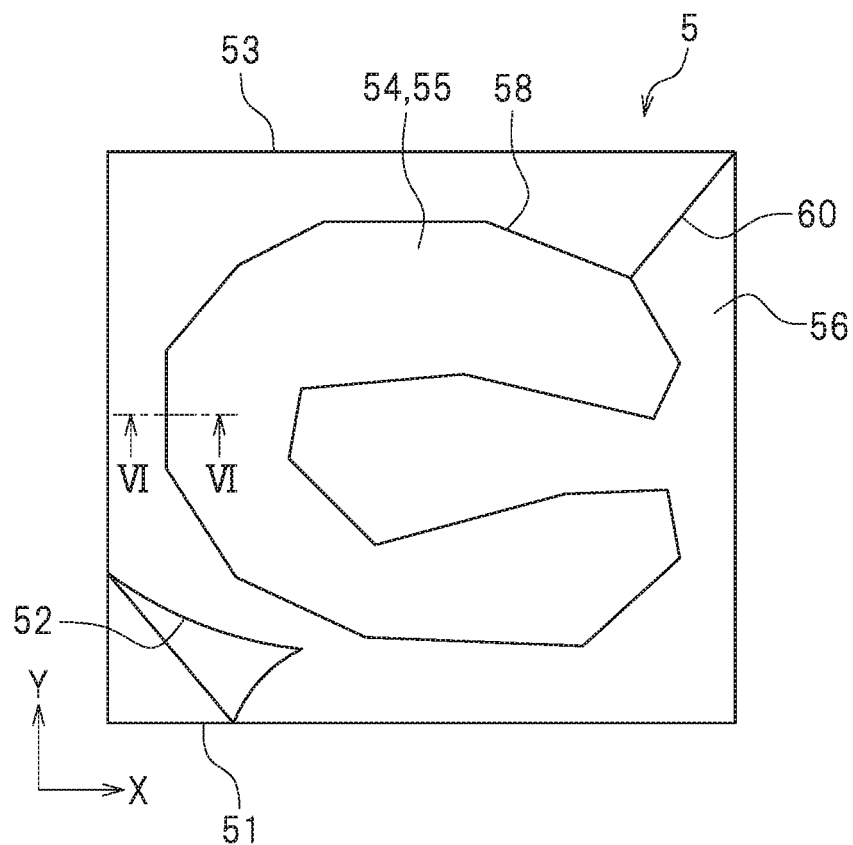
FIG. 5 is a schematic diagram illustrating a sheet.
Figure 6:
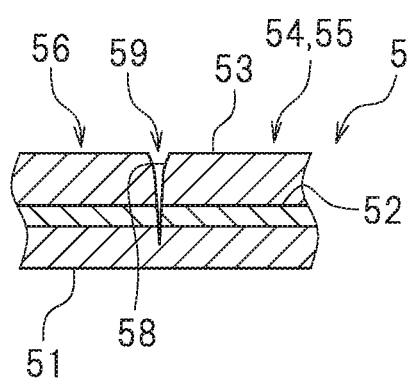
FIG. 6 is a cross-sectional view of the sheet taken along the line VI-VI in FIG. 5.

Examples of the sheet 5 to be cut by the cutting apparatus 10 include a label and a sticker. FIG. 5 is a schematic diagram illustrating the sheet 5. FIG. 6 is a cross-sectional view of the sheet 5 taken along the line VI-VI in FIG. 5. As illustrated in FIG. 5, the sheet 5 includes a base sheet 51 and a top sheet 53. The top sheet 53 is affixed to a surface of the base sheet 51 with an adhesive material 52 (see FIG. 6), such as an adhesive agent. A desired target object 54 is located on the top sheet 53. The top sheet 53 includes an effective region 55 and a non-effective region 56. The effective region 55 and the non-effective region 56 are defined by an outline 58 of the target object 54 serving as a boundary between the effective region 55 and the non-effective region 56. The effective region 55 is a region of the top sheet 53 to be left on the base sheet 51. The effective region 55 is a necessary region on which the target object 54, for example, is located. The non-effective region 56 is a region of the top sheet 53 to be removed from the base sheet 51. The non-effective region 56 is a region of the top sheet 53 other than the effective region 55. The non-effective region 56 is an unnecessary region. A portion of the top sheet 53 within the non-effective region 56 will undergo disposal. Alternatively, the effective region 55 may be a region of the top sheet 53 other than the target object 54. In such a case, the non-effective region 56 is a region of the top sheet 53 on which the target object 54 is located. A portion of the top sheet 53 within the effective region 55 may be referred to as a "target object sheet" when deemed appropriate. A portion of the top sheet 53 within the non-effective region 56 may be referred to as an "unnecessary sheet" when deemed appropriate.

In the present preferred embodiment, a cut is made along the outline 58 of the target object 54 on the sheet 5. As used herein, the term "cut" refers to a cut 59. As illustrated in FIG. 6, the cut 59 has a depth from the surface of the top sheet 53 to an upper portion of the base sheet 51. The cut 59 is made by the cutting apparatus 10. In the present preferred embodiment, making the cut 59 along the outline 58 enables the effective region 55 and the non-effective region 56 to be separated from each other. Making the cut 59 along the outline 58 also allows only a portion of the top sheet 53 within the non-effective region 56 (i.e., the unnecessary sheet) to be removed from the base sheet 51, with a portion of the top sheet 53 within the effective region 55 (i.e., the target object sheet) remaining on the base sheet 51.

In the present preferred embodiment, a cut is made on the top sheet 53 in addition to the cut 59 made along the outline 58. This additional cut will be referred to as a "cutting line 60". The cutting line 60 serves to facilitate successful removal of the unnecessary sheet within the non-effective region 56 from the base sheet 51. Referring to FIG. 5, the cutting line 60 is located within the non-effective region 56 of the top sheet 53. If no cutting line 60 is provided, a portion of the top sheet 53 within the non-effective region 56 may not be successfully removed from the base sheet 51 depending on the shape of the target object 54. This may split or tear a portion of the top sheet 53 within the effective region 55 (i.e., the target object sheet). Accordingly, the cutting line 60 is provided on a portion of the top sheet 53 within the non-effective region 56 in order to prevent the target object sheet from splitting and tearing.

Conventionally, a location of the cutting line 60 in the non-effective region 56 of the top sheet 53, for example, is decided by a user based on his or her experience. Thus, some users may be unable to place the cutting line 60 at an optimal location. If the cutting line 60 is not placed at an optimal location, an unnecessary portion of the top sheet 53 within the non-effective region 56 may not be properly removed from the base sheet 51. This may break a portion of the top sheet 53 within the effective region 55 or tear a portion of the top sheet 53 within the non-effective region 56, causing the portion of the top sheet 53 to partially remain on the base sheet 51.

The inventor of preferred embodiments of the present invention has conducted studies on locations for cutting lines in order to determine an optimal location of cutting lines that enables proper removal of a portion of the top sheet 53 within the non-effective region 56 from the base sheet 51. As a result, the inventor of preferred embodiments of the present invention has discovered that an unnecessary portion of the top sheet 53 within the non-effective region 56 is properly removed from the base sheet 51 by placing a cutting line at a location described below.

Figure 7:
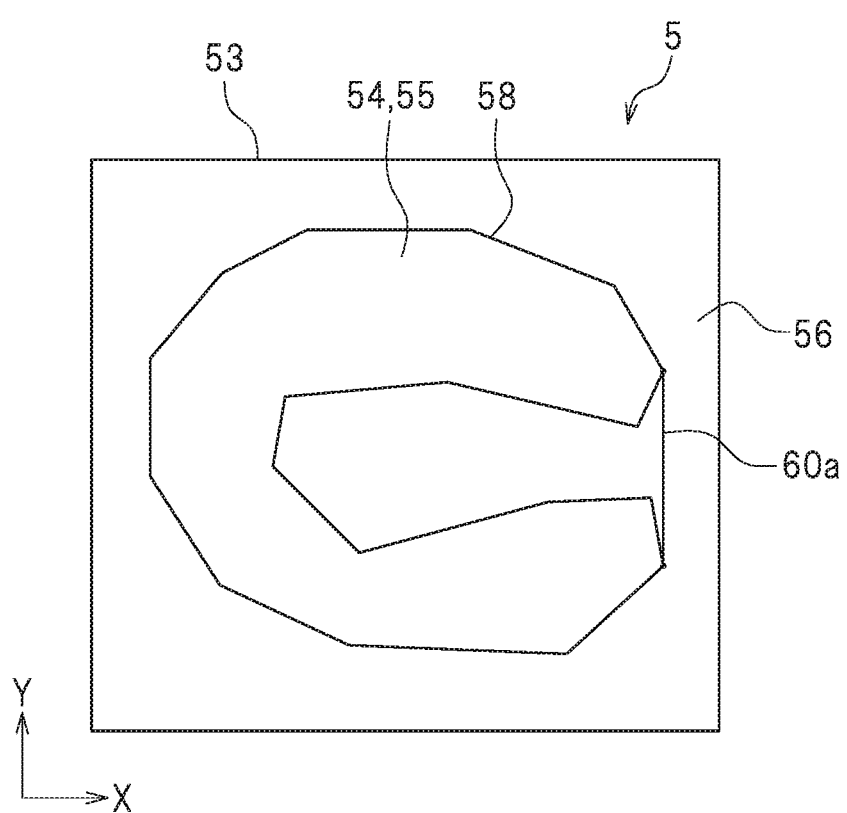
FIG. 7 is a diagram illustrating a location of a lasso cutting line.

FIG. 7 is a schematic diagram of the sheet 5, illustrating a location of a cutting line 60a. As illustrated in FIG. 7, the inventor of preferred embodiments of the present invention has first discovered that the cutting line 60a is preferably placed such that the cutting line 60a is a line connecting predetermined points on the outline 58 of the target object 54 and surrounding the effective region 55 together with a portion of the outline 58 of the target object 54. In the present preferred embodiment, the effective region 55 is a region of the top sheet 53 where the target object 54 is located, so that the cutting line 60a is a line surrounding the target object 54 together with a portion of the outline 58 of the target object 54. The cutting line 60a is preferably placed such that the cutting line 60a forms a loop together with a portion of the outline 58 of the target object 54. Referring to FIG. 7 illustrating the sheet 5, portions of the top sheet 53 within the non-effective region 56 are removed from the base sheet 51 at two different times. First, a portion of the top sheet 53 located within the non-effective region 56 and outward of the cutting line 60a (i.e., an outer edge portion of the top sheet 53) is removed from the base sheet 51. Subsequently, a portion of the top sheet 53 located within the non-effective region 56, inward of the cutting line 60a, and surrounded by the cutting line 60a and the outline 58 is removed from the base sheet 51. Placing the cutting line 60a as illustrated in FIG. 7 enables removal of a portion of the top sheet 53 located within the non-effective region 56 and outward of the cutting line 60a, and then enables removal of a portion of the top sheet 53 located within the non-effective region 56 and having a complicated shape. Thus, the cutting line 60a facilitates removal of the portions of the top sheet 53 within the non-effective region 56 from the base sheet 51. In the present preferred embodiment, the cutting line 60a placed such that the cutting line 60a forms a loop together with a portion of the outline 58 of the target object 54 will be referred to as a "lasso cutting line 60a".

In the present preferred embodiment, the cutting line positioning apparatus 100 automatically places the lasso cutting line 60a on the top sheet 53 of the sheet 5. The cutting apparatus then makes a cut along the cutting line placed by the positioning apparatus 100.

The cutting line positioning apparatus 100 will be described in detail below. As illustrated in FIG. 4, the positioning apparatus 100 may be separate from the cutting apparatus 10 or may be built into the cutting apparatus 10. The positioning apparatus 100 is electrically and communicably connected to the controller 45 of the cutting apparatus 10. In one example, the positioning apparatus 100 may be a computer including a central processing unit (CPU), a read-only memory (ROM) storing, for example, a program to be executed by the CPU, and a random-access memory (RAM). The present preferred embodiment includes using a program stored in a computer so as to decide a location of a lasso cutting line. The positioning apparatus 100 may be implemented by a computer dedicated to the cutting system 1 or may be implemented by a general-purpose computer.

In the present preferred embodiment, the positioning apparatus 100 includes a storage processor 112, a region setting processor 114, a candidate point selection processor 116, a search point selection processor 118, a reference line setting processor 120, a candidate line setting processor 121, a candidate line selection processor 123, an angle calculation processor 124, a cutting line setting processor 125, a deletion determination processor 126, a deletion processor 127, an end determination processor 129, and a change processor 130. The processors of the positioning apparatus 100 may be implemented by software or hardware. The processors of the positioning apparatus 100 may be built into circuit(s). Specific functions of the processors mentioned above will be described below.

The following description discusses a procedure for deciding a location of a lasso cutting line. The lasso cutting line location deciding procedure will be first briefly described, and then the steps of the procedure will be described in detail.

Figure 9:
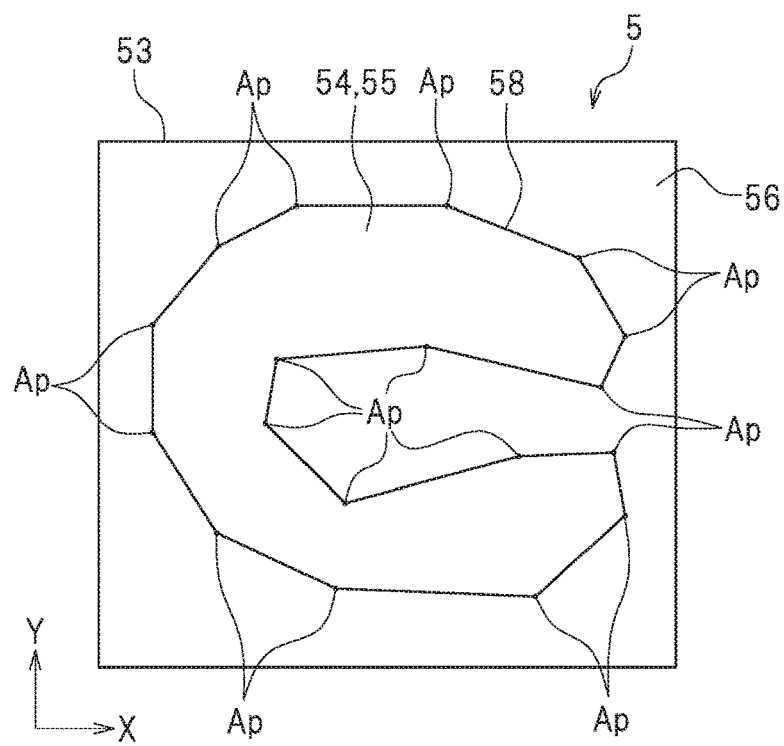
FIG. 9 is a schematic diagram of a top sheet, illustrating the lasso cutting line location deciding procedure.

As illustrated in FIG. 9, the outline 58 is represented as a polyline in the present preferred embodiment. As used herein, the term "polyline" refers to a collection of a plurality of continuous line segments. Connecting vertices provides line segments continuous with each other. In the present preferred embodiment, vertices that will be endpoints of a lasso cutting line (which may hereinafter be referred to as "selected vertices") are selected from vertices obtained when the outline 58 is represented as a polyline (which may hereinafter be referred to as "polyline vertices"). A line provided by connecting adjacent selected vertices on the outline 58 in a predetermined circumferential direction (e.g., in a clockwise direction) is determined to be a lasso cutting line. Such a procedure places a lasso cutting line that surrounds the effective region 55 together with a portion of the outline 58 of the target object 54.

Figure 8:
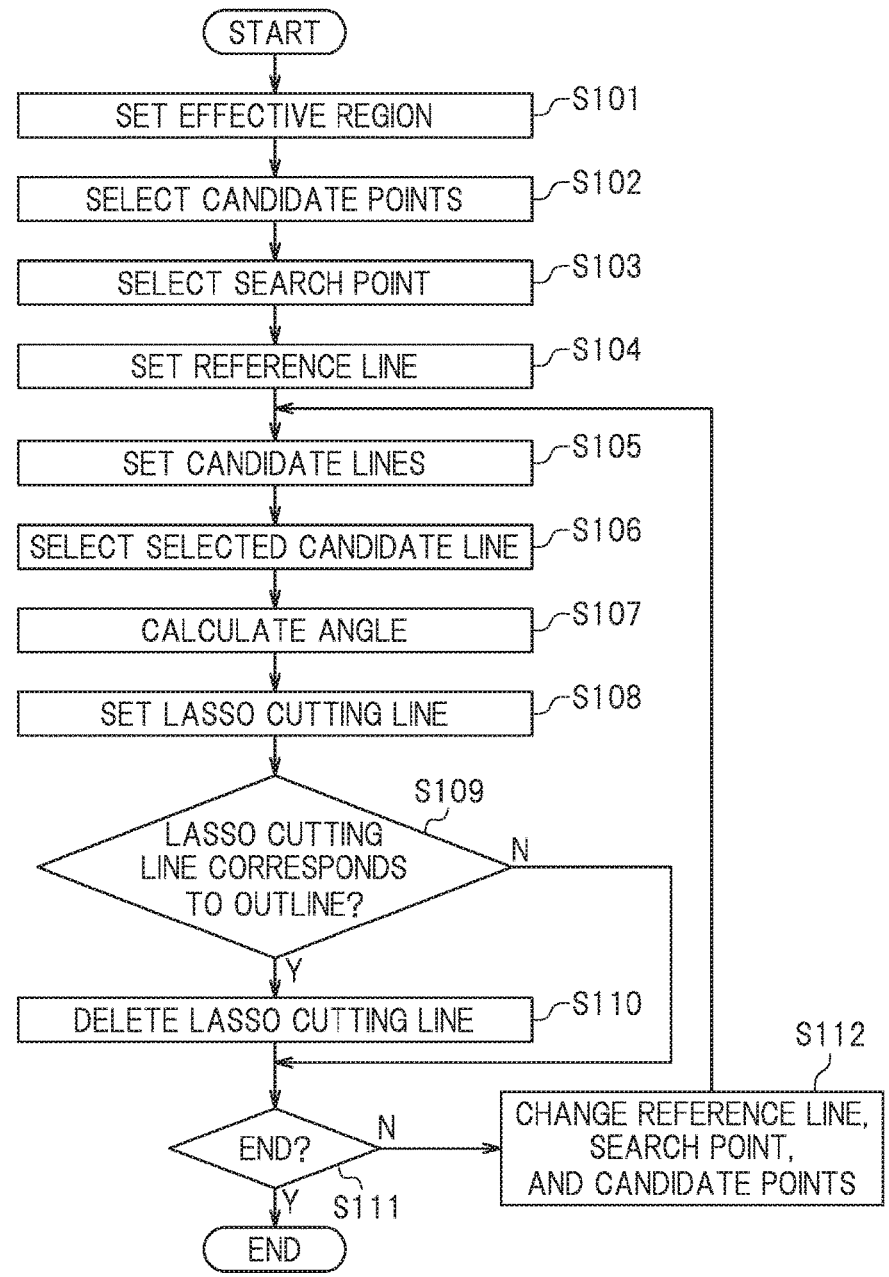
FIG. 8 is a flow chart illustrating a procedure for deciding a location of a lasso cutting line.

FIG. 8 is a flow chart illustrating the lasso cutting line location deciding procedure. As illustrated in FIG. 7, a portion of the top sheet 53 within a region where the target object 54 is located is a necessary sheet. Referring to the flow chart of FIG. 8, the following description discusses in detail how a lasso cutting line is placed such that the lasso cutting line surrounds the target object 54 together with a portion of the outline 58. In the following description, the top sheet 53 is image data of the top sheet 53. The following description is based on the assumption that the top sheet 53 is located on an X-Y coordinate system.

First, in step S101 in FIG. 8, the region setting processor 114 sets the effective region 55 selected from regions of the top sheet 53 as illustrated in FIG. 9. A region of the top sheet 53 other than the effective region 55 is set to be the non-effective region 56. In the present preferred embodiment, a lasso cutting line is located within the non-effective region 56. The effective region 55 may be set in any suitable manner. In one example, the user may select the effective region 55 using a user interface (UI) provided on the operation panel 17 (see FIG. 1). In such an example, a region selected by the user is set to be the effective region 55 by the region setting processor 114, and a region other than the effective region 55 selected by the user is set to be the non-effective region 56 by the region setting processor 114. In the present preferred embodiment, a region including the target object 54 is set to be the effective region 55. Information on the effective region 55 and the non-effective region 56 is stored in the storage processor 112.

In step S102 in FIG. 8, the candidate point selection processor 116 selects candidate points that may each serve as an endpoint of a lasso cutting line. As illustrated in FIG. 9, the candidate point selection processor 116 presents the outline 58 in the form of a polyline. In other words, the candidate point selection processor 116 presents the outline 58 in the form of a plurality of continuous line segments. Polyline vertices on the outline 58 that are obtained when the outline 58 is represented as a polyline are set to be candidate points Ap by the candidate point selection processor 116. All the polyline vertices on the outline 58 illustrated in FIG. 9 are the candidate points Ap.

Figure 10:
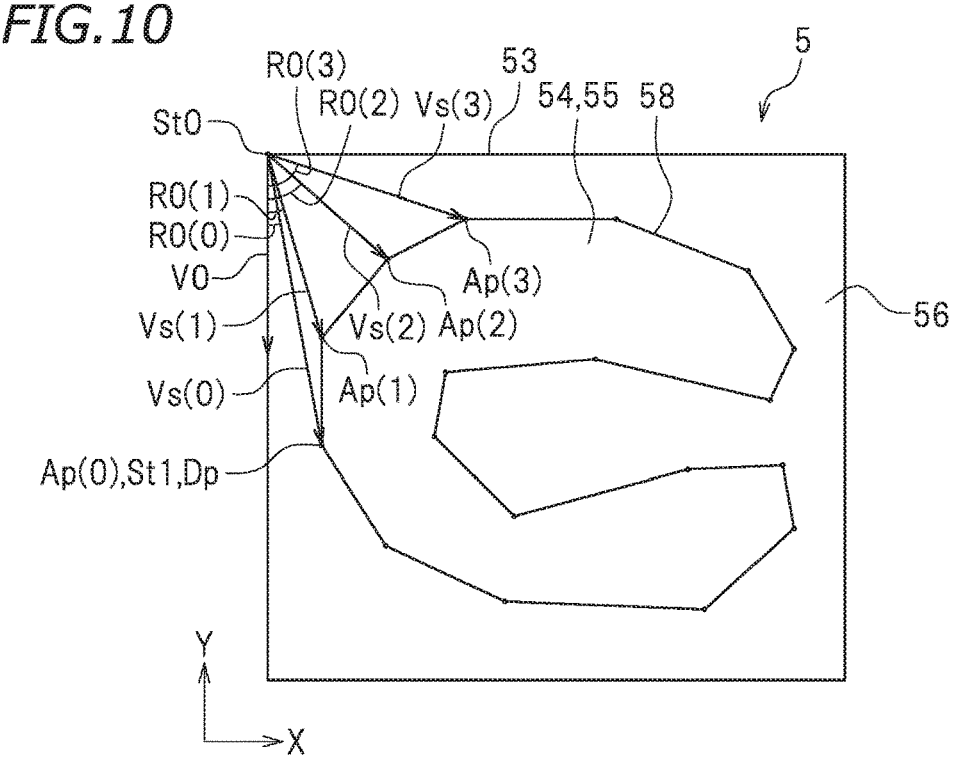
FIG. 10 is a schematic diagram of the top sheet, illustrating the lasso cutting line location deciding procedure.

In step S103 in FIG. 8, the search point selection processor 118 selects a search point St1 from which a search starts as illustrated in FIG. 10. In the present preferred embodiment, the search point selection processor 118 selects an end determination point Dp in addition to selecting the search point St1. The search point St1 is a reference point to be used to search for a point that serves as an endpoint of a lasso cutting line. The search point St1 is one of the candidate points Ap (see FIG. 9) on the outline 58. The end determination point Dp is used to determine end of the procedure in step S111 (which will be described below) in FIG. 8. In the present preferred embodiment, the search point St1 is identical to the end determination point Dp. The search point St1 and the end determination point Dp may be selected in any suitable manner. In one example, the search point St1 and the end determination point Dp may be set in a manner described below.

As illustrated in FIG. 10, a reference point St0 and a reference vector V0 extending in a predetermined direction from the reference point St0 are set in advance on the top sheet 53 in the present preferred embodiment. The positions of the reference point St0 and the reference vector V0 are stored in advance in the storage processor 112. The reference vector V0 is an example of a "first line". The reference point St0 and the reference vector V0 may be located at any suitable positions. In one example, the reference point St0 is a point located at the upper left end of the top sheet 53 in FIG. 10. The reference vector V0 extends in a predetermined direction from the reference point St0. In the present preferred embodiment, the predetermined direction is a Y coordinate negative direction that is a downward direction in FIG. 10. In FIG. 10, for convenience of description, only some of the candidate points Ap are identified by associated reference signs Ap(0) to Ap(3). The search point selection processor 118 sets vectors Vs(0) to Vs(3) to be search vectors. The vectors Vs(0) to Vs(3) each connect the reference point St0 with an associated one of the candidate points Ap(0) to Ap(3) selected in step S102. Although some of the search vectors are not illustrated in FIG. 10, the search vectors are actually set for all the candidate points Ap. In the present preferred embodiment, each of the search vectors Vs(0) to Vs(3) is an example of a "second line".

The search point selection processor 118 calculates search angles R0(0) to R0(3). The search angle R0(0) is defined between the reference vector V0 and the search vector Vs(0). The search angle R0(1) is defined between the reference vector V0 and the search vector Vs(1). The search angle R0(2) is defined between the reference vector V0 and the search vector Vs(2). The search angle R0(3) is defined between the reference vector V0 and the search vector Vs(3). The search angles are calculated for all the search vectors. The search point selection processor 118 subsequently selects the candidate point included in the search vector defining a search angle with the reference vector that is the smallest search angle calculated, and sets the selected candidate point to be the search point St1 and the end determination point Dp. In FIG. 10, the search angle R0(0) is smaller than each of the search angles R0(1) to R0(3), so that the search angle R0(0) is the smallest search angle. Thus, the candidate point Ap(0) that is a candidate point included in the search vector Vs(0) is set to be the search point St1 and the end determination point Dp.

Figure 11:
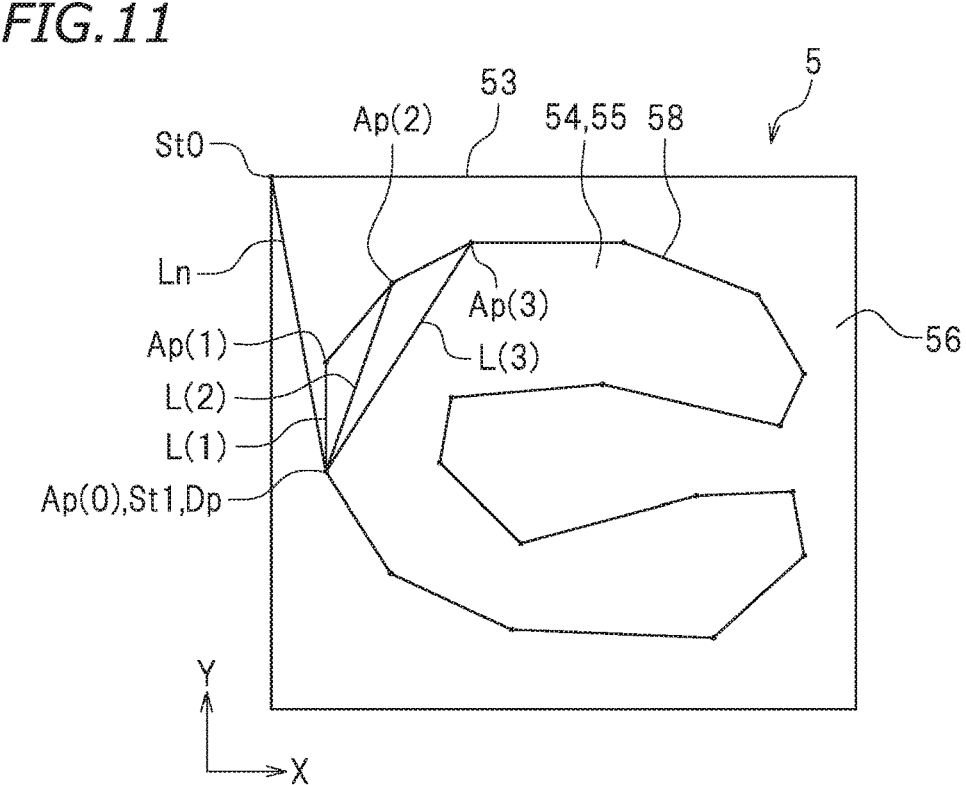
FIG. 11 is a schematic diagram of the top sheet, illustrating the lasso cutting line location deciding procedure.

In step S104 in FIG. 8, the reference line setting processor 120 sets a reference line Ln. As used herein, the term "reference line" refers to a reference line to be used to calculate an angle R1 in step S107 (which will be described below) in FIG. 8. As illustrated in FIG. 11, a line connecting the reference point St0, stored in advance in the storage processor 112, with the search point St1 selected in step S103 is set to be the reference line Ln by the reference line setting processor 120 in the present preferred embodiment.

In step S105 in FIG. 8, the candidate line setting processor 121 sets candidate lines that are candidates for a lasso cutting line. Referring to FIG. 11, the candidate line setting processor 121 sets lines L(1) to L(3) to be the candidate lines. The lines L(1) to L(3) each connect the search point St1 with an associated one of the candidate points Ap(1) to Ap(3) other than the candidate point Ap(0) set to be an endpoint of the reference line Ln. The present preferred embodiment includes setting a plurality of candidate lines in this manner. Although some of the plurality of candidate lines are not illustrated in FIG. 11, the candidate lines are actually set for the candidate points Ap (see FIG. 9) other than the candidate point Ap(0).

In step S106 in FIG. 8, the candidate line selection processor 123 selects a candidate line located only within the non-effective region 56 from the plurality of candidate lines L(1) to L(3). In the example illustrated in FIG. 11, none of the candidate lines L(1) to L(3) is located only within the non-effective region 56. When no candidate line is located only within the non-effective region 56 as in this example, the candidate line selection processor 123 selects a candidate line located on the outline 58 and extending in a predetermined circumferential direction. Specifically, when no candidate line is located only within the non-effective region 56, the candidate line selection processor 123 selects a candidate line that is located on the outline 58 represented as a polyline and extends in the clockwise direction in the present preferred embodiment. The predetermined circumferential direction is stored in advance in the storage processor 112. In FIG. 11, the candidate line L(1) is located on the outline 58, and the candidate lines L(2) and L(3) are at least partially located within the effective region 55. Thus, the candidate line selection processor 123 selects the candidate line L(1). In the present preferred embodiment, the candidate line selected by the candidate line selection processor 123 in step S106 will be referred to as a "selected candidate line".

In step S107 in FIG. 8, the angle calculation processor 124 calculates an angle between the reference line Ln and the selected candidate line selected in step S106. As used herein, the term "angle between the reference line Ln and the selected candidate line" refers to an angle between 0 degrees and 90 degrees inclusive. Referring to FIG. 11, only the line L(1) is selected as the selected candidate line in step S106. In this case, the angle calculation processor 124 calculates an angle between the reference line Ln and the selected candidate line L(1). Alternatively, step S107 may be omitted when a single selected candidate line is selected in step S106.

Figure 12:
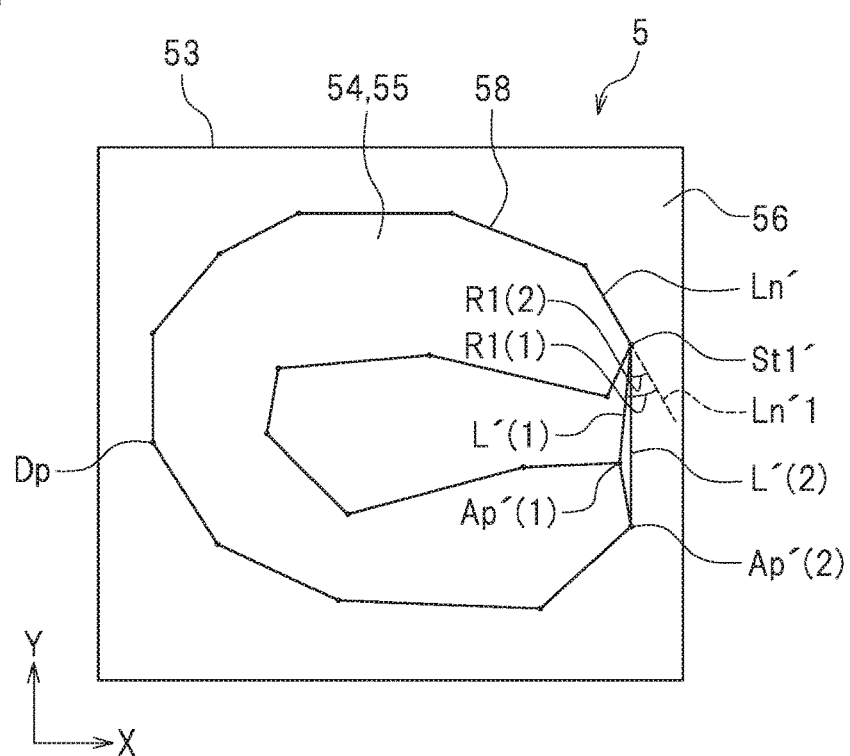
FIG. 12 is a schematic diagram of the top sheet, illustrating the lasso cutting line location deciding procedure.

In the example illustrated in FIG. 12, the reference line is represented as a reference line Ln'. In this example, the candidate line selection processor 123 selects candidate lines L'(1) and L'(2) as the selected candidate lines in step S106. The candidate line L'(1) includes a candidate point Ap'(1), and the candidate line L'(2) includes a candidate point Ap'(2). In the example illustrated in FIG. 12, the angle calculation processor 124 calculates an angle R1(1) between the selected candidate line L'(1) and an extended reference line Ln'1 extended from the reference line Ln', and an angle R1(2) between the selected candidate line L'(2) and the extended reference line Ln'1 extended from the reference line Ln'. When the angle between the reference line Ln' and the selected candidate line L'(1) and the angle between the reference line Ln' and the selected candidate line L'(2) are each greater than 90 degrees as in the example illustrated in FIG. 12, the angle calculation processor 124 calculates the angle R1(1) between the selected candidate line L'(1) and the extended reference line Ln'1 extended from the reference line Ln', and the angle R1(2) between the selected candidate line L'(2) and the extended reference line Ln'1 extended from the reference line Ln'. The angle calculation processor 124 calculates the angles R1(1) and R1(2) on the assumption that the reference line Ln' includes the extended reference line Ln'1. The angles R1(1) and R1(2) calculated by the angle calculation processor 124 are stored in the storage processor 112.

In step S108 in FIG. 8, the cutting line setting processor 125 sets a lasso cutting line. The lasso cutting line set in step S108 is a line connecting the search point St1 with a candidate point that is an endpoint of the selected candidate line defining an angle with the reference line that is the smallest angle calculated in step S107. Referring to FIG. 11, there is only a single selected candidate line that is the candidate line L(1). Thus, a straight line connecting the search point St1 with the candidate point Ap(1) that is an endpoint of the selected candidate line L(1) is set to be a lasso cutting line. In this case, the selected candidate line L(1) is set to be a lasso cutting line. The lasso cutting line may be a straight line or a curve.

In the example illustrated in FIG. 12, the angle R1(2) is smaller than the angle R1(1). This means that the angle R1(2) is the smallest angle calculated in step S107. In this case, a line connecting a search point St1' with the candidate point Ap'(2) that is an endpoint of the selected candidate line L'(2) having the angle R1(2) is set to be a lasso cutting line by the cutting line setting processor 125.

In step S109 in FIG. 8, the deletion determination processor 126 determines whether the lasso cutting line set in step S108 (which immediately precedes step S109) corresponds to the outline 58. In the example illustrated in FIG. 11, the selected candidate line L(1) that is a straight line connecting the candidate point Ap(1) with the search point St1 is set to be a lasso cutting line. The lasso cutting line L(1) corresponds to a portion of the outline 58. In this example, the deletion determination processor 126 determines that the lasso cutting line L(1) corresponds to the outline 58. Then, the procedure goes to step S110. In step S110, the deletion processor 127 deletes the lasso cutting line L(1) set in step S108. Because the lasso cutting line L(1) corresponding to the outline 58 is deleted in this manner, a cut is made only along the outline 58. This prevents a cut from being dually made along the same line.

In the example illustrated in FIG. 12, the selected candidate line L'(2) that is a straight line connecting the candidate point Ap'(2) with the search point St1' is set to be a lasso cutting line. The lasso cutting line L'(2) does not correspond to the outline 58. In this example, the deletion determination processor 126 determines in step S109 that the lasso cutting line L'(2) does not correspond to the outline 58. Then, the procedure goes to step S111.

In step S111 in FIG. 8, the end determination processor 129 determines end of the procedure. In the present preferred embodiment, the end determination processor 129 ends the procedure when a candidate point adjacent to the candidate point Ap(1) in a predetermined circumferential direction relative to the candidate point Ap(1) is the end determination point Dp in the example illustrated in FIG. 11. In FIG. 11, the candidate point Ap(1) is an endpoint of the selected candidate line L(1) set to be a lasso cutting line. When the candidate point adjacent to the candidate point Ap(1) in the predetermined circumferential direction is not the end determination point Dp, the procedure goes to step S112. In the example illustrated in FIG. 11, the candidate point adjacent to the candidate point Ap(1) in the predetermined circumferential direction relative to the candidate point Ap(1) is the candidate point Ap(2). Because the candidate point Ap(2) is not the end determination point Dp, the procedure goes to step S112 in the example illustrated in FIG. 11.

Figure 13:
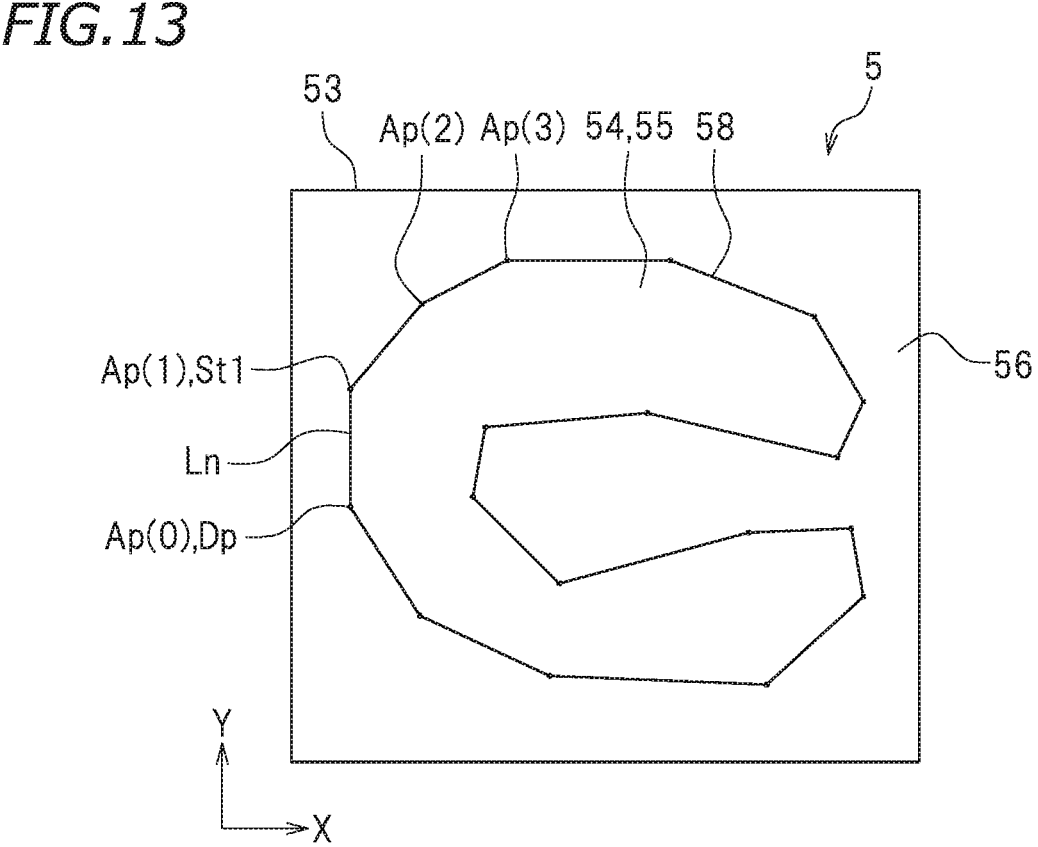
FIG. 13 is a schematic diagram of the top sheet, illustrating the lasso cutting line location deciding procedure.

In step S1 12 in FIG. 8, the change processor 130 changes the reference line Ln, the search point St1, and the candidate points. In the example illustrated in FIG. 11, a line connecting the search point St1 with the candidate point Ap(1) of the selected candidate line L(1) set to be the lasso cutting line in step S108 is changed to a new reference line Ln (see FIG. 13) by the change processor 130. In this example, the change processor 130 changes the selected candidate line L(1) to the new reference line Ln. The candidate point Ap(1) of the selected candidate line L(1), set to be the lasso cutting line as illustrated in FIG. 11, is set to be a new search point St1 (see FIG. 13) by the change processor 130. The change processor 130 changes the candidate points to new candidate points. As illustrated in FIG. 13, the new candidate points are candidate points Ap(2), Ap(3) . . . located between the new search point St1 and the end determination point Dp in a predetermined circumferential direction (i.e., in the clockwise direction in the present preferred embodiment) relative to the new search point St1. After the end of step S112, the procedure returns to step S105 in FIG. 8. Repeatedly performing steps S105 to S112 enables placement of other lasso cutting lines.

The lasso cutting line location deciding procedure has been described thus far. Deciding a lasso cutting line location by performing the above procedure places the lasso cutting line 60a at the location illustrated in FIG. 7, for example.

After a location of a lasso cutting line on the top sheet 53 is decided by the positioning apparatus 100 in the above-described manner, the cutting apparatus 10 may make a cut along the lasso cutting line and the outline 58 of the target object 54.

As illustrated in FIG. 7, the present preferred embodiment places the lasso cutting line 60a at a location where the lasso cutting line 60a surrounds the effective region 55 together with a portion of the outline 58 of the target object 54. As illustrated in FIG. 9, polyline vertices obtained when the outline 58 is represented as a polyline are set to be the candidate points Ap, so that a larger number of candidate points Ap are provided. Thus, an endpoint of a lasso cutting line is selected from a larger number of candidate points Ap. This facilitates placement of the lasso cutting line 60a at an optimal location. The placement of the lasso cutting line 60a allows a portion of the top sheet 53 located within the non-effective region 56 and having a complicated shape to be removed from the base sheet 51 at a later time. Thus, the present preferred embodiment facilitates removal of a portion of the top sheet 53 within the non-effective region 56 from the base sheet 51. Consequently, the present preferred embodiment prevents breakage and tearing of a portion of the top sheet 53 within the effective region 55.

In the present preferred embodiment, the cutting line setting processor 125 selects, for example, one of the candidate lines L'(1) and L'(2) located only within the non-effective region 56 and sets the selected candidate line to be a lasso cutting line as illustrated in FIG. 12. Thus, as illustrated in FIG. 7, the lasso cutting line 60a set by the cutting line setting processor 125 is not located within the effective region 55 that is a necessary region. Consequently, the present preferred embodiment enables automatic placement of the lasso cutting line 60a such that the lasso cutting line 60a does not overlap with a portion of the top sheet 53 within the effective region 55 that is a necessary region.

In the present preferred embodiment, the storage processor 112 stores the reference point St0 and the reference vector V0 extending in the predetermined direction from the reference point St0 (i.e., in the Y coordinate negative direction from the reference point St0) as illustrated in FIG. 10. The search point selection processor 118 calculates the search angles R0(0) to R0(3). The search angle R0(0) is defined between the reference vector V0 and the search vector Vs(0) connecting the reference point St0 with the candidate point Ap(0). The search angle R0(1) is defined between the reference vector V0 and the search vector Vs(1) connecting the reference point St0 with the candidate point Ap(1). The search angle R0(2) is defined between the reference vector V0 and the search vector Vs(2) connecting the reference point St0 with the candidate point Ap(2). The search angle R0(3) is defined between the reference vector V0 and the search vector Vs(3) connecting the reference point St0 with the candidate point Ap(3). The search point selection processor 118 then selects, as the search point St1, the candidate point of the search vector defining a search angle with the reference vector V0 that is the smallest search angle calculated. Thus, the candidate point close to the reference vector V0 is set to be the search point St1.

In the present preferred embodiment, after the lasso cutting line is set by the cutting line setting processor 125 as illustrated in FIG. 11, the line connecting the candidate point Ap(1) of the lasso cutting line, set by the cutting line setting processor 125, with the search point St1 selected by the search point selection processor 118 is set to be the new reference line Ln (see FIG. 13) by the change processor 130 in step S112 in FIG. 8. The candidate point Ap(1) of the lasso cutting line, set by the cutting line setting processor 125 as illustrated in FIG. 11, is set to be the new search point St1 (see FIG. 13) by the change processor 130. The change processor 130 changes the candidate points to new candidate points. As illustrated in FIG. 13, the new candidate points are the candidate points Ap(2), Ap(3) . . . located between the new search point St1 and the end determination point Dp in the predetermined circumferential direction (i.e., in the clockwise direction in the present preferred embodiment) relative to the new search point St1. Then, the procedure returns to step S105 in FIG. 8. In step S105, lines each connecting the new search point St1 (see FIG. 13) with an associated one of the new candidate points Ap(2), Ap(3) . . . are set to be new candidate lines by the candidate line setting processor 121. In step S106 in FIG. 8, the candidate line selection processor 123 selects, as the new selected candidate line, the new candidate line located only within the non-effective region 56 from the new candidate lines set in step S105. When none of the new candidate lines is located only within the non-effective region 56, the candidate line selection processor 123 selects, as the new selected candidate line, the new candidate line on the outline 58. In step S107 in FIG. 8, the angle calculation processor 124 calculates an angle between the new reference line Ln (see FIG. 13) and the new selected candidate line. In step S108 in FIG. 8, a line connecting the new search point St1 (see FIG. 13) with the new candidate point of the new selected candidate line defining an angle with the reference line Ln that is the smallest angle calculated by the angle calculation processor 124 is set to be a lasso cutting line by the cutting line setting processor 125. Steps S105 to S112 are repeatedly carried out in the above-described manner unless the end determination processor 129 determines in step S111 that the procedure should end. Thus, the present preferred embodiment facilitates automatic placement of the lasso cutting line 60a such that the lasso cutting line 60a surrounds the effective region 55 together with a portion of the outline 58 of the target object 54.

The processors of the positioning apparatus 100 (i.e., the storage processor 112, the region setting processor 114, the candidate point selection processor 116, the search point selection processor 118, the reference line setting processor 120, the candidate line setting processor 121, the candidate line selection processor 123, the angle calculation processor 124, the cutting line setting processor 125, the deletion determination processor 126, the deletion processor 127, the end determination processor 129, and the change processor 130) may be implemented by software. Specifically, a computer program may be executed by a computer so as to implement the processors of the positioning apparatus 100 by the computer. Preferred embodiments of the present invention include a cutting line positioning computer program to allow a computer to function as the processors. Preferred embodiments of the present invention also include a non-transitory computer-readable storage medium storing the computer program. The processors of the positioning apparatus 100 may be implemented by executing the computer program stored in the positioning apparatus 100. In this case, each of the processors of the positioning apparatus 100 may be a single processor or a plurality of processors. Preferred embodiments of the present invention also include a circuit having the functions similar to those of a program to be executed by each of the processors of the positioning apparatus 100. Preferred embodiments of the present invention also include a cutting line positioning method to be performed by the processors of the positioning apparatus 100.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A cutting line positioning apparatus to decide a location of a cutting line on a sheet, the sheet including a base sheet and a top sheet affixed with an adhesive material to a surface of the base sheet and including a target object located thereon, the cutting line serving as a reference line when a cut is made on the top sheet, the top sheet being cut along an outline of the target object on the top sheet by a cutting apparatus, wherein the top sheet includes an effective region that is a region of the top sheet to be left on the base sheet, and a non-effective region that is a region of the top sheet to be removed from the base sheet, the cutting line positioning apparatus comprising:

a storage processor configured or programmed to store a reference point defined in advance on the top sheet;

a candidate point selection processor configured or programmed to select a plurality of vertices on the outline obtained when the outline is represented as a polyline, the vertices each being selected as a candidate point that serves as an endpoint of the cutting line;

a search point selection processor configured or programmed to select, from the candidate points, a reference search point to be used to search for a point that serves as an endpoint of the cutting line;

a reference line setting processor configured or programmed to set a reference line connecting the reference point with the search point;

a candidate line setting processor configured or programmed to set candidate lines including a plurality of lines each connecting the search point with an associated one of the candidate points other than the search point;

a candidate line selection processor configured or programmed to select, as a selected candidate line, the candidate line located only within the non-effective region, and select, as the selected candidate line, the candidate line on the outline when none of the candidate lines is located only within the non-effective region;

an angle calculation processor configured or programmed to calculate an angle between the reference line and the selected candidate line; and a cutting line setting processor configured or programmed to set the cutting line connecting the search point with the candidate point of the selected candidate line defining an angle with the reference line that is a smallest angle calculated by the angle calculation processor.

2. The cutting line positioning apparatus according to claim 1, wherein the storage processor is configured or programmed to store a preset first line extending in a predetermined direction from the reference point; and the search point selection processor is configured or programmed to calculate search angles between the first line and second lines that connect the reference point with an associated one of the candidate points, and select, as the search point, the candidate point of the second line defining a search angle with the first line that is a smallest search angle calculated.

3. The cutting line positioning apparatus according to claim 1, wherein the search point selection processor selects the search point as an end determination point;

the cutting line positioning apparatus further comprises a change processor configured or programmed to, after the cutting line is set by the cutting line setting processor, change the reference line to a new reference line that connects the candidate point of the cutting line with the search point, change the candidate point of the cutting line to a new search point, and change the candidate points to new candidate points, the new candidate points being the candidate points located between the new search point and the end determination point in a predetermined circumferential direction relative to the new search point;

the candidate line setting processor sets new candidate lines each connecting the new search point with an associated one of the new candidate points;

the candidate line selection processor selects, as a new selected candidate line, the new candidate line located only within the non-effective region, and selects, as the new selected candidate line, the new candidate line on the outline when none of the new candidate lines is located only within the non-effective region;

the angle calculation processor calculates an angle between the new reference line and the new selected candidate line; and the cutting line setting processor sets a cutting line connecting the new search point with the new candidate point of the new selected candidate line defining an angle with the new reference line that is a smallest angle calculated by the angle calculation processor.

4. A cutting system comprising:
a cutting apparatus; and
the cutting line positioning apparatus according to claim 1.

5. A non-transitory computer-readable storage medium storing a cutting line positioning computer program, the computer program being operable to allow a computer to execute a cutting line positioning method for deciding a location of a cutting line on a sheet, the sheet including a base sheet and a top sheet affixed with an adhesive material to a surface of the base sheet and having a target object located thereon, the cutting line serving as a reference line when a cut is made on the top sheet, the top sheet being cut along an outline of the target object on the top sheet by a cutting apparatus, wherein the top sheet includes an effective region that is a region of the top sheet to be left on the base sheet, and a non-effective region that is a region of the top sheet to be removed from the base sheet, the method comprising:

a candidate point selection step including selecting a plurality of vertices on the outline obtained when the outline is represented as a polyline, the vertices each being selected as a candidate point that serves as an endpoint of the cutting line;

a search point selection step including selecting, from the candidate points, a reference search point to be used to search for a point that serves as an endpoint of the cutting line;

a reference line setting step including setting a reference line connecting the search point with a reference point defined in advance on the top sheet;

a candidate line setting step including setting candidate lines including a plurality of lines each connecting the search point with an associated one of the candidate points other than the search point;

a candidate line selection step including selecting, as a selected candidate line, the candidate line located only within the non-effective region, and selecting, as the selected candidate line, the candidate line on the outline when none of the candidate lines is located only within the non-effective region;

an angle calculation step including calculating an angle between the reference line and the selected candidate line; and a cutting line setting step including setting the cutting line connecting the search point with the candidate point of the selected candidate line defining an angle with the reference line that is a smallest angle calculated in the angle calculation step.

6. A cutting line positioning method for deciding a location of a cutting line on a sheet, the sheet including a base sheet and a top sheet affixed with an adhesive material to a surface of the base sheet and having a target object located thereon, the cutting line serving as a reference line when a cut is made on the top sheet, the top sheet being cut along an outline of the target object on the top sheet by a cutting apparatus, wherein the top sheet includes an effective region that is a region of the top sheet to be left on the base sheet, and a non-effective region that is a region of the top sheet to be removed from the base sheet, the method comprising:

a candidate point selection step including selecting a plurality of vertices on the outline obtained when the outline is represented as a polyline, the vertices each being selected as a candidate point that serves as an endpoint of the cutting line;

a search point selection step including selecting, from the candidate points, a reference search point to be used to search for a point that serves as an endpoint of the cutting line;

a reference line setting step including setting a reference line connecting the search point with a reference point defined in advance on the top sheet;

a candidate line setting step including setting candidate lines including a plurality of lines each connecting the search point with an associated one of the candidate points other than the search point;

a candidate line selection step including selecting, as a selected candidate line, the candidate line located only within the non-effective region, and selecting, as the selected candidate line, the candidate line on the outline when none of the candidate lines is located only within the non-effective region;

an angle calculation step including calculating an angle between the reference line and the selected candidate line; and a cutting line setting step including setting the cutting line connecting the search point with the candidate point of the selected candidate line defining an angle with the reference line that is a smallest angle calculated in the angle calculation step.

7. The cutting line positioning method according to claim 6, wherein the search point selection step includes calculating search angles between preset first line and second lines, the first line extending in a predetermined direction from the reference point, the second lines each connecting the reference point with an associated one of the candidate points, and selecting, as the search point, the candidate point of the second line defining a search angle with the first line that is a smallest search angle calculated.

8. The cutting line positioning method according to claim 6, wherein the search point selection step includes selecting the search point as an end determination point;

the method further comprises a change step including, after the cutting line is set in the cutting line setting step, changing the reference line to a new reference line that connects the candidate point of the cutting line with the search point, changing the candidate point of the cutting line to a new search point, and changing the candidate points to new candidate points located between the new search point and the end determination point in a predetermined circumferential direction relative to the new search point;

the candidate line setting step includes setting lines each connecting the new search point with an associated one of the new candidate points;

the candidate line selection step includes selecting, as a new selected candidate line, the new candidate line located only within the non-effective region, and selecting, as the new selected candidate line, the new candidate line on the outline when none of the new candidate lines is located only within the non-effective region;

the angle calculation step includes calculating an angle between the new reference line and the new selected candidate line; and the cutting line setting step includes setting a cutting line connecting the new search point with the new candidate point of the new selected candidate line defining an angle with the new reference line that is a smallest angle calculated in the angle calculation step.

* * * * *